United States Patent
Mo et al.

(10) Patent No.: US 10,492,512 B2
(45) Date of Patent: Dec. 3, 2019

(54) CHEWING GUM BASE CONTAINING POLYFARNESENE AND CHEWING GUM PRODUCTS MADE THERE FROM

(75) Inventors: Xiaoqun Mo, Oak Park, IL (US); Michael J. Greenberg, Northbrook, IL (US)

(73) Assignee: WM. WRIGLEY JR. COMPANY, Chicago, IL (US)

( * ) Notice: Subject to any disclaimer, the term of this patent is extended or adjusted under 35 U.S.C. 154(b) by 422 days.

(21) Appl. No.: 13/990,066

(22) PCT Filed: Dec. 1, 2011

(86) PCT No.: PCT/US2011/062754
§ 371 (c)(1),
(2), (4) Date: May 29, 2013

(87) PCT Pub. No.: WO2012/075216
PCT Pub. Date: Jun. 7, 2012

(65) Prior Publication Data
US 2013/0251846 A1 Sep. 26, 2013

Related U.S. Application Data (60) Provisional application No. 61/419,137, filed on Dec. 2, 2010.

(51) Int. Cl.
*A23G 4/08* (2006.01)
*A23G 4/06* (2006.01)

(52) U.S. Cl.
CPC .................. *A23G 4/08* (2013.01); *A23G 4/06* (2013.01)

(58) Field of Classification Search
CPC .................... A23G 4/08; A23G 4/06
USPC .......................................... 426/3
See application file for complete search history.

(56) References Cited

U.S. PATENT DOCUMENTS

| | | | |
|---|---|---|---|
| 4,446,125 A | 5/1984 | Mookherjee et al. | |
| 7,247,326 B2 | 7/2007 | Sodergard | |
| 7,655,739 B1 | 2/2010 | McPhee et al. | |
| 2007/0280892 A1* | 12/2007 | Kindel | A61K 8/33 424/49 |
| 2009/0081291 A1* | 3/2009 | Gin | A61K 8/02 424/468 |
| 2009/0130250 A1 | 5/2009 | Anderson et al. | |
| 2010/0056714 A1 | 3/2010 | McPhee | |
| 2010/0056743 A1 | 3/2010 | McPhee | |
| 2012/0178771 A1* | 7/2012 | Babul | A61K 9/1635 514/282 |
| 2012/0237632 A1 | 9/2012 | Phillips et al. | |
| 2012/0269924 A1 | 10/2012 | Phillips et al. | |
| 2013/0052301 A1* | 2/2013 | Morgret | A23G 4/08 426/4 |

FOREIGN PATENT DOCUMENTS

| | | |
|---|---|---|
| WO | 2002076231 A1 | 10/2002 |
| WO | 2002076232 A1 | 10/2002 |
| WO | 2010027464 A1 | 3/2010 |
| WO | 2011031993 A2 | 3/2011 |
| WO | 2011032026 A2 | 3/2011 |
| WO | 2011032031 A1 | 3/2011 |

OTHER PUBLICATIONS

NPL Hydrogenated vegetable oil (Retrieved on Jan. 31, 2019) [Wikepedia] [evidentiary reference] (Year: 2019).*
Richard A. Newmark, Ramendra N. Majumdar, 13C-NMR SPectra of cis-Polymyrcene and cis-Polyfarnesene, Received Nov. 14, 1986, Accepted Jan. 23, 1987, pp. 1-7, 3M, St. Paul, Minnesota, USA.

* cited by examiner

*Primary Examiner* — Bhaskar Mukhopadhyay (57) ABSTRACT

A chewing gum base comprises food acceptable polyfarnesene wherein the polyfarnesene has a weight average molecular weight above 100,000 daltons. A chewing gum composition comprises about 5% to about 95% chewing gum base comprising food acceptable polyfarnesene wherein the polyfarnesene has a weight average molecular weight above 100,000 daltons; about 5% to about 95% bulking and sweetening agent; and about 0.1 to about 10% flavoring agent.

16 Claims, 4 Drawing Sheets

CHEWING GUM BASE CONTAINING POLYFARNESENE AND CHEWING GUM PRODUCTS MADE THERE FROM

PRIORITY DATA

The present patent application is a 371 of international application Ser. No. PCT/US11/62754 filed Dec. 1, 2011, which claims benefit from U.S. Ser. No. 61/419,137, filed Dec. 2, 2010, and incorporates by reference from the above-identified applications as if they are entirely restated herein.

BACKGROUND OF THE INVENTION

The present invention relates to chewing gum. More specifically, this invention relates to improved formulations for chewing gum bases and chewing gums containing polyfarnesene.

The fundamental components of a chewing gum typically are a water-insoluble gum base portion and a water-soluble bulking agent portion. The primary component of the gum base is an elastomeric polymer which provides the characteristic chewy texture of the product. The gum base will typically include other ingredients which modify the chewing properties or aid in processing the product. These include plasticizers, softeners, fillers, emulsifiers, plastic resins, as well as colorants and antioxidants. The water soluble portion of the chewing gum typically includes a bulking agent together with minor amounts of secondary components such as flavors, high-intensity sweeteners, colorants, water-soluble softeners, gum emulsifiers, acidulants and sensates. Typically, the water-soluble portion, sensates, and flavors dissipate during chewing and the gum base is retained in the mouth throughout the chew, resulting in a gum cud.

One problem with traditional gum bases is the fact that conventional gum bases are predominantly made from polymers that are derived from non-renewable resources. While chicle and other naturally occurring polymers have been used in the past to make chewing gum, polymers from natural sources tend to have properties that fluctuate, most commonly with the season of the year. This makes it difficult to formulate quality chewing gum products on a consistent basis. Hence, chewing gum bases commonly made today use a number of man-made polymers derived from petroleum feed stocks. For example, butyl rubber is derived from petroleum chemicals. This has the advantage that the polymers are consistent over time, and properties desirable in the chewing gum can be taken into account when the polymers are made to achieve the desired chew characteristic for the chewing gum product. However, since petroleum is a diminishing resource, and subject to disruption in its supply, and food grade polymers derived there-from may be available from a limited number of sources, a butyl rubber alternative would alleviate dependence on petroleum chemicals, and create an innovative gum base using biobased material. It would be desirable to provide a chewing gum base that could be made from renewable resources but that also provided the chewing gum with a texture, mouth feel and other chew characteristics that are desirable.

SUMMARY OF THE INVENTION

Novel chewing gum bases have been invented comprising food acceptable polymers derived from farnesene, which is a renewable product. Polyfarnesene may be used as an elastomer alternative.

In one embodiment, a chewing gum base comprises food acceptable polyfarnesene wherein the polyfarnesene has a weight average molecular weight above 100,000 daltons.

In another embodiment, a chewing gum composition comprises about 5% to about 95% chewing gum base comprising food acceptable polyfarnesene wherein the polyfarnesene has a weight average molecular weight above 100,000 daltons; about 5% to about 95% bulking and sweetening agent; and about 0.1 to about 10% flavoring agent.

Since farnesene is a monomer that comes from renewable sources, polyfarnesene as a gum base ingredient replaces man-made polymers derived from petroleum feed stocks. Additional features and advantages of the disclosed embodiments are described in, and will be apparent from, the following Detailed Description and the attached drawings.

DETAILED DESCRIPTION

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Unless otherwise specified, all percentages herein are weight percentages. Several terms used in the specification and claims have a meaning defined as follows.

The term "farnesene" refers to six closely related chemical compounds having a formula $C_{15}H_{24}$ and which all are sesquiterpenes, namely the various isomers of α-farnesene and β-farnesene. α-farnesene and β-farnesene are themselves isomers, differing by the location of one double bond. α-Farnesene is 3,7,11-trimethyl-1,3,6,10-dodecatetraene and β-farnesene is 7,11-dimethyl-3-methylene-1,6,10-dodecatriene. The alpha form can exist as four stereoisomers that differ about the geometry of two of its three internal double bonds (the stereoisomers of the third internal double bond are identical). The beta isomer exists as two stereoisomers about the geometry of its central double bond. Farnesene is typically derived from cellulosic material, such as sugar cane.

The term "polyfarnesene" includes homopolymers and interpolymers containing farnesene molecules as a major constituent of the polymer. The homopolymers can be made from α-farnesene, β-farnesene and combinations thereof. The polymer may be cross linked. The polyfarnesene may be made by a controlled polymerization process so that the resulting polymer has properties that are consistent from batch to batch. U.S. Patent Application Publication No. 2010/0056753, which is hereby incorporated by reference, discloses some polyfarnesene structures and methods of making farnesene and polyfarnesene.

The term "weight average molecular weight" or "molecular weight" is determined by using gel permeation chromatography (GPC) using a polystyrene standard and a standard detector.

A variety of gum base and chewing gum formulations including polyfarnesene can be created and/or used in the present invention. In some embodiments, a polyfarnesene may be used as the sole elastomer or it may be combined with other base elastomers for use in the chewing gum base. The gum base will typically comprise from 5 to 95% polyfarnesene by weight of the gum base, preferably 5 to 75% polyfarnesene by weight of the gum base, and more preferably from 30 to 60% polyfarnesene by weight of the gum base. In some embodiments, the gum base comprises up to 30% by weight of at least one elastomer other than polyfarnesene, preferably from 1.5 to 11% by weight of at least one elastomer other than polyfarnesene. Such other elastomers, where used, include synthetic elastomers including polyisobutylene, as well as isobutylene-isoprene copolymers, styrene-butadiene copolymers, polyisoprene, polyolefin thermoplastic elastomers such as ethylene-propylene copolymer and ethylene-octene copolymer and combinations thereof. Natural elastomers that can be used in the gum base in addition to the polyfarnesene include natural rubbers such as chicle and proteins such as zein or gluten. In some embodiments, the polyfarnesene may be blended with removable or environmentally degradable homopolymers such as polylactides, and polyesters prepared from food acceptable acids and alcohols.

The polyfarnesene used in the gum bases of the present invention will be "food acceptable". This means that it will not contain any byproducts or residual products that are harmful to humans at the level present in the product.

It is preferable that the polyfarnesene used in the present invention be food grade. While requirements for being food grade vary from country to country, food grade polymers intended for use as masticatory substances (i.e. gum base) will typically have to meet one or more of the following criteria. They may have to be approved by local food regulatory agencies for this purpose. They may have to be manufactured under "Good Manufacturing Practices" (GMPs) which may be defined by local regulatory agencies, such practices ensuring adequate levels of cleanliness and safety for the manufacturing of food materials. Materials (including reagents, catalysts, solvents and antioxidants) used in the manufacture will desirably be food grade (where possible) or at least meet strict standards for quality and purity. The finished product may have to meet minimum standards for quality and the level and nature of any impurities present, including residual monomer content. The manufacturing history of the material may be required to be adequately documented to ensure compliance with the appropriate standards. The manufacturing facility itself may be subject to inspection by governmental regulatory agencies. Again, not all of these standards may apply in all jurisdictions. As used herein, the term "food grade" will mean that the polyfarnesene meets all applicable food standards in the locality where the product is manufactured and/or sold.

In some embodiments, the present invention provides for gum base formulations which are conventional gum bases that include wax or are wax-free. In some embodiments, the present invention provides for chewing gum formulations that can be low or high moisture formulations containing low or high amounts of moisture-containing syrup. Low moisture chewing gum formulations are those which contain less than 1.5% or less than 1% or even less than 0.5% water. Conversely, high moisture chewing gum formulations are those which contain more than 1.5% or more than 2% or even more than 2.5% water. The polyfarnesene gum base of the present invention can be used in sugar-containing chewing gums and also in low sugar and non-sugar containing gum formulations made with sorbitol, mannitol, other sugar alcohols, and non-sugar carbohydrates.

In some embodiments, the polyfarnesene may be the sole component of the water insoluble gum base. In other embodiments, the polyfarnesene and possible other elastomers will be combined with softeners, fillers, antioxidants and other conventional, non-elastomeric gum base components. In some embodiments, the polyfarnesene gum bases may be used to replace conventional gum bases in chewing gum formulas which additionally contain water-soluble bulking agents, flavors, high-intensity sweeteners, colors, pharmaceutical or nutraceutical agents and other optional ingredients. These chewing gums may be formed into sticks, tabs, tapes, coated or uncoated pellets or balls or any other desired form. By substituting polyfarnesene for a portion or all of the conventional gum base elastomers, consumer-acceptable chewing gum products can be manufactured.

The polyfarnesene, when used according to the present invention, affords the chewing gum consumer acceptable texture. Because the polyfarnesene has chewing properties similar to other elastomers in most respects, gum bases containing polyfarnesene create a resultant chewing gum product that has a high consumer-acceptability.

The polyfarnesene used in the gum base of the present invention will typically have a glass transition temperature ($T_g$) substantially below mouth temperature. Specifically, the polyfarnesene will have a $T_g$ below a 10° C., and more preferably will have a $T_g$ below −76° C. The glass transition temperature of the polyfarnesene can be conventionally measured using Differential Scanning calorimetry (DSC) as is well known in the art. In the present invention, it is also important that the polymer have a $T_g$ sufficiently low as to allow convenient and efficient processing, especially when the polyfarnesene is to be used as the sole component in a gum base. Use of polyfarnesene having this $T_g$ range allows lower processing temperatures and shorter mixing times. Preferably the polyfarnesene will have a degradation resistance so that it has a decomposition temperature, $T_d$ (1% weight loss), above 275° C.

The molecular weight of the polyfarnesene will be selected to provide the desired textural properties when incorporated into a chewing gum base or chewing gum. The optimal molecular weight for this purpose will vary depending upon the composition of the gum base or gum product, whether a homopolymer or polyfarnesene copolymer is used, and the extent of any cross linking, but will generally have a weight average molecular weight above 100,000 daltons, preferably above 200,000 daltons; more preferably above 400,000 daltons; and even more preferably above 900,000 daltons. In some embodiments the polyfarnesene will have a weight average molecular weight above 1,500,000 daltons.

Typically, polyfarnesene will be prepared by polymerizing suitable monomer reagents. This polymerization may be carried out by any appropriate polymerization reaction such as free radical polymerization, condensation polymerization, anionic polymerization, cationic polymerization or emulsion polymerization. Of course, appropriate reaction conditions and catalysts will be used throughout the process. Alternatively, any process effective to produce a polyfarnesene having the above identified attributes may be employed.

When a polyfarnesene interpolymer is made, at least one other comonomer is polymerized with the farnesene. Preferably that other comonomer is selected from the group consisting of isoprene, styrene, vinyl acetate, isopropylallylcarbonate, isopropylisopropenyl carbonate, N-vinyl pyrrolidinone, maleic acid, maleic ester, 1,3butadiene, methacrylic acids (such as 2-methyl propenoic acid), methacrylic esters, methyl 1,3cyclopentadiene, and 1,3pentadiene.

In some embodiments, the polyfarnesene is cross-linked. In some cases, the polyfarnesene is prepared by polymerizing α-farnesene and/or β-farnesene and then further cross-linking the polyfarnesene. The cross linking may be achieved using a cross-linking agent, such as an agent selected from the group consisting of isoprene, styrene, vinyl acetate, and vinylsilane. The cross linking may also be achieved by producing free radicals, such as by using radiation and oxidation. For example, cross linking may be achieved by adding peroxide to cause free radicals by oxidation. In a preferred embodiment, the polyfarnesene is prepared by polymerizing β-farnesene by an anionic polymerization in a solvent with an organolithium reagent. Suitable organolithium reagents include n-butyl lithium and sec-butyl lithium. Preferably the polyfarnesene is prepared using a catalyst selected from the group consisting of Azo bisisobutyronitrile and t-butyl peroxide.

When used to formulate a gum base of the present invention, it is preferred that the polyfarnesene be plasticized with a suitable plasticizing agent to form an elastomeric material which, when formulated as a gum base, has sufficient chewing cohesion to be cud-forming and chewable at mouth temperatures. Plasticizers typically function to lower the $T_g$ of a polymer to make the gum cud chewable at mouth temperature. Suitable plasticizing agents are substances of relatively low molecular weight which have a solubility parameter similar to the polymer so they are capable of intimately mixing with the polymer and reducing the $T_g$ of the mixture to a value lower than the polymer alone. Generally, any food acceptable plasticizer which functions to soften the polyfarnesene and render it chewable at mouth temperature will be a suitable plasticizer. Plasticizers which may be used in the present invention include triacetin, phospholipids such as lecithin and phosphatidylcholine, triglycerides of $C_4$-$C_6$ fatty acid such as glycerol trihexanoate, polyglycerol, polyricinoleate, propylene glycol di-octanoate, propylene glycol di-decanoate, triglycerol penta-caprylate, triglycerol penta-caprate, decaglyceryl hexaoleate, decaglycerol decaoleate, citric acid esters of mono- or di-glycerides, polyoxyethylene sorbitan such as POE (80) sorbitan monolaurate, and POE (20) sorbitan monooleate.

Fats, waxes and acetylated monoglycerides can enhance the effect of the suitable plasticizers when incorporated into the gum bases of the present invention. However, fats and waxes may not be suitable for use as the sole plasticizers in these compositions.

The water-insoluble gum base of the present invention may optionally contain conventional petroleum-based elastomers such as styrene-butadiene rubber, butyl rubber, polyisobutylene and polyisoprene, and may contain elastomer solvents such as terpene resins and estergums. Where used, these conventional elastomer solvents may be combined in any compatible ratio with the polyfarnesene. Other ingredients which may optionally be employed include inorganic fillers such as calcium carbonate and talc, emulsifiers such as lecithin and mono- and di-glycerides, plastic resins such as polyvinyl acetate (PVAc), polyvinyl laurate, and vinyl acetate-vinyl laurate copolymers and antioxidants.

A typical gum base useful in this invention includes about 5 to 95% polyfarnesene, 0 to 20% synthetic elastomer, 0 to 20% natural elastomer, about 0 to about 40% by weight elastomer solvent, about 0 to about 35% filler, and about 0 to about 35% softener. Further, a typical gum base includes at least 5% and more typically at least 10% softener and includes up to 35% and more typically up to 30% softener. Still further, a typical gum base includes 5 to 40% and more typically 15 to 30% hydrophilic modifiers such as polyvinyl acetate. Minor amounts (e.g., up to about 1%) of miscellaneous ingredients such as antioxidants and the like also may be included into a gum base of the present invention.

In an embodiment, a chewing gum base of the present invention contains about 4 to about 35% filler, about 5 to about 35% softener, about 5 to about 40% hydrophilic modifier and optional minor amounts (about one percent or less) of miscellaneous ingredients such as antioxidants and the like.

Additional elastomers may include, but are not limited to, polyisobutylene having a viscosity average molecular weight of about 100,000 to about 800,000, isobutylene-isoprene copolymer (butyl elastomer), polyolefin thermoplastic elastomers such as ethylene-propylene copolymer and ethylene-octene copolymer, styrene-butadiene copolymers having styrene-butadiene ratios of about 1:3 to about 3:1 and/or polyisoprene, and combinations thereof. Natural elastomers which may be similarly incorporated into the gum bases of the present inventions include jelutong, lechi caspi, perillo, sorva, massaranduba balata, massaranduba chocolate, nispero, rosindinha, chicle, gutta hang kang, and combinations thereof.

A typical gum base containing polyfarnesene of the present invention may have a complex viscosity, measured as a gum cud at 37° C., of between $1 \times 10^3$ and $1 \times 10^7$ Poise. Gum bases having a complex viscosity in this range have been found to have acceptable chewing properties.

A suitable polyfarnesene used in this invention typically should be free of strong, undesirable off-tastes (i.e. objectionable flavors which cannot be masked) and have an ability to incorporate flavor materials which provide a consumer-acceptable flavor sensation. Suitable polyfarnesene should also be safe and food acceptable, i.e. capable of being food approved by government regulatory agencies for use as a masticatory substance, i.e. chewing gum base. Furthermore, it is preferable that the polymers be prepared using only food safe catalysts, reagents and solvents.

Typically, the polyfarnesene will have sufficient chewing cohesion such that a chewing gum composition containing such material forms a discrete gum cud with consumer acceptable chewing characteristics.

Elastomer solvents commonly used for petroleum-based elastomers may be optionally used in this invention including but are not limited to, natural rosin esters, often called estergums, such as glycerol esters of partially hydrogenated rosin, glycerol esters of polymerized rosin, glycerol esters of partially or fully dimerized rosin, glycerol esters of rosin, pentaerythritol esters of partially hydrogenated rosin, methyl and partially hydrogenated methyl esters of rosin, pentaerythritol esters of rosin, glycerol esters of wood rosin, glycerol esters of gum rosin; synthetics such as terpene resins derived from alpha-pinene, beta-pinene, and/or d-limonene; and any suitable combinations of the foregoing. The preferred elastomer solvents also will vary depending on the specific application, and on the type of elastomer which is used. A preferred gum base of the present invention will comprise from 1 to 40% terpene resin. A preferred terpene resin has a melting point of between 120° C. and 128° C.

The gum base may also include plastic resins. These include polyvinyl acetate having a GPC weight average molecular weight of about 2,000 to about-200,000, polyethylene, vinyl acetate-vinyl laurate copolymer having vinyl laurate content of about 5 to about 50% of the copolymer, and combinations thereof. Preferred weight average molecular weights (by GPC) for polyvinyl acetate are between 8,000 daltons and 150,000 daltons. For polyvinyl acetate, from 20 to 30% by weight of the gum base of polyvinyl acetate may be used. For vinyl acetate-vinyl laurate, vinyl laurate content of 10-45% of the copolymer is preferred.

Additionally, a gum base may include fillers, texturizers and softeners/emulsifiers. Softeners (including emulsifiers) are added to chewing gum in order to optimize the chewability and mouth feel of the gum.

Softeners/emulsifiers that typically are used include tallow, hydrogenated tallow, hydrogenated and partially hydrogenated vegetable oils, cocoa butter, mono- and di-glycerides such as glycerol monostearate, glycerol triacetate, acetylated mono- and di-glycerides, lecithin, paraffin wax, microcrystalline wax, natural waxes and combinations thereof. Lecithin and mono- and di-glycerides also function as emulsifiers to improve compatibility of the various gum base components. A preferred gum base of the present invention may comprise from 3 to 8% emulsifier. A preferred gum base of the present invention may also comprise from 1 to 50% wax, more preferably from 1 to −30% wax. A preferred wax will have a melting point of at least −80° C. A preferred gum base may also comprise from 0.1 to 20% fat having a melting point of at least 45° C. Preferred fats include hydrogenated soybean oil, partially hydrogenated soybean oil, hydrogenated cotton seed oil, partially hydrogenated cotton seed oil, hydrogenated palm oil, partially hydrogenated palm oil, hydrogenated vegetable oil, partially hydrogenated vegetable oil and mixtures thereof.

Fillers/texturizers typically are inorganic, water-insoluble powders such as magnesium and calcium carbonate, ground limestone, silicate types such as magnesium and aluminum silicate, clay, alumina, talc, titanium oxide, mono-, di- and tri-calcium phosphate and calcium sulfate. Insoluble organic fillers including cellulose polymers such as wood as well as combinations of any of these also may be used. A preferred gum base of the present invention will comprise from 1 to −50% filler, and more preferably from 10 to 40% filler.

Selection of various components in chewing gum bases or chewing gum formulations of this invention typically are dictated by factors, including for example the desired properties (e.g., physical (mouthfeel), taste, odor, and the like) and/or applicable regulatory requirements (e.g., in order to have a food grade product, food grade components, such as food grade approved oils like vegetable oil, may be used.)

Colorants and whiteners may include FD&C-type dyes and lakes, fruit and vegetable extracts, titanium dioxide, and combinations thereof.

Antioxidants such as BHA, BHT, tocopherols, propyl gallate and other food acceptable antioxidants may be employed to prevent oxidation of fats, oils and elastomers in the gum base.

A water-insoluble gum base typically constitutes approximately 5 to about 95% of a chewing gum of this invention; more commonly, the gum base comprises 10 to about 50% of a chewing gum of this invention; and in some preferred embodiments, 20 to about 40% of such a chewing gum.

In addition to a water-insoluble gum base portion, a typical chewing gum composition includes a water-soluble bulk portion (or bulking agent) and one or more flavoring agents. The water-soluble portion can include high intensity sweeteners, binders, flavoring agents (which may be water insoluble), water-soluble softeners, gum emulsifiers, colorants, acidulants, fillers, antioxidants, and other components that provide desired attributes.

Water-soluble softeners, which may also known as water-soluble plasticizers and plasticizing agents, generally constitute between approximately 0.5 to about 15% of the chewing gum. Water-soluble softeners may include glycerin, lecithin, and combinations thereof. Aqueous sweetener solutions such as those containing sorbitol, hydrogenated starch hydrolysates (HSH), corn syrup and combinations thereof, may also be used as softeners and binding agents (binders) in chewing gum.

Preferably, a bulking agent or bulk sweetener is useful in chewing gums of this invention to provide sweetness, bulk and texture to the product. Typical bulking agents include sugars, sugar alcohols, and combinations thereof. Bulking agents typically constitute from about 5 to about 95% of the chewing gum, more typically from about 20 to about 80% and, still more typically, from about 30 to about 70% of the gum. Sugar bulking agents generally include saccharide containing components commonly known in the chewing gum art, including, but not limited to, sucrose, dextrose, maltose, dextrin, dried invert sugar, fructose, levulose, galactose, corn syrup solids, and the like, alone or in combination. In sugarless gums, sugar alcohols such as sorbitol, maltitol, erythritol, isomalt, mannitol, xylitol and combinations thereof are substituted for sugar bulking agents. Combinations of sugar and sugarless bulking agents may also be used.

In addition to the above bulk sweeteners, chewing gums typically comprise a binder/softener in the form of a syrup or high-solids solution of sugars and/or sugar alcohols. In the case of sugar gums, corn syrups and other dextrose syrups (which contain dextrose and significant amounts higher saccharides) are most commonly employed. These include syrups of various DE levels including high-maltose syrups and high fructose syrups. In the case of sugarless products, solutions of sugar alcohols including sorbitol solutions and hydrogenated starch hydrolysate syrups are commonly used. Also useful are syrups such as those disclosed in U.S. Pat. No. 5,651,936 and U.S. Patent Application Publication No. 2004-234648 which are incorporated herein by reference. Such syrups serve to soften the initial chew of the product, reduce crumbliness and brittleness and increase flexibility in stick and tab products. They may also control moisture gain or loss and provide a degree of sweetness depending on the particular syrup employed. In the case of syrups and other aqueous solutions, it is generally desirable to use the minimum practical level of water in the solution to the minimum necessary to keep the solution free-flowing at acceptable handling temperatures. The usage level of such syrups and solutions should be adjusted to limit total moisture in the gum to less than 3%, preferably less than 2% and most preferably less than 1%.

High intensity sweeteners can also be used in combination with the above-described sweeteners. Preferred sweeteners include, but are not limited to sucralose, aspartame, salts of acesulfame, alitame, neotame, saccharin and its salts, cyclamic acid and its salts, glycyrrhizin, stevia and stevia compounds such as rebaudioside A, dihydrochalcones, thaumatin, monellin, lo han guo and the like, alone or in combination. In order to provide longer lasting sweetness and flavor perception, it may be desirable to encapsulate or otherwise control the release of at least a portion of the artificial sweetener. Such techniques as wet granulation, wax granulation, spray drying, spray chilling, fluid bed coating, coacervation, and fiber extrusion may be used to achieve the desired release characteristics.

Usage level of the high intensity sweetener will vary greatly and will depend on such factors as potency of the sweetener, rate of release, desired sweetness of the product, level and type of flavor used and cost considerations. Thus, the active level of high intensity sweetener may vary from 0.02 to about 8%. When carriers used for encapsulation are included, the usage level of the encapsulated sweetener will be proportionately higher. A preferred gum composition may comprise at least one of an encapsulated flavor and encapsulated sweetener.

Combinations of sugar and/or sugarless sweeteners may be used in chewing gum. Additionally, the softener may also provide additional sweetness such as with aqueous sugar or alditol solutions.

If a low calorie gum is desired, a low caloric bulking agent can be used. Examples of low caloric bulking agents include: polydextrose; Raftilose, Raftilin; fructooligosaccharides (NutraFlora); Palatinose oligosaccharide; Guar Gum Hydrolysate (Sun Fiber); or indigestible dextrin (Fibersol). However, other low calorie bulking agents can be used. In addition, the caloric content of a chewing gum can be reduced by increasing the relative level of gum base while reducing the level of caloric sweeteners in the product. This can be done with or without an accompanying decrease in piece weight.

A variety of flavoring agents can be used. The flavor can be used in amounts of approximately 0.1 to about 10% of the gum, and preferably, about 0.2 to about 5%. Flavoring agents may include essential oils, synthetic flavors or mixtures thereof including, but not limited to, oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorial acceptable fashion. Sensate components which impart a perceived tingling or thermal response while chewing, such as a cooling or heating effect, also may be included. Such components include cyclic and acyclic carboxamides, menthol derivatives, and capsaicin among others. Acidulants may be included to impart tartness.

In addition to typical chewing gum components, chewing gums of the present invention may include active agents such as dental health actives such as minerals, nutritional supplements such as vitamins, health promoting actives such as antioxidants for example resveratrol, stimulants such as caffeine, medicinal compounds and other such additives. These active agents may be added neat to the gum mass or encapsulated using known means to prolong release and/or prevent degradation. The actives may be added to coatings, rolling compounds and liquid or powder fillings where such are present.

It may be desirable to add components to the gum or gum base composition which enhance environmental degradation of the chewed cud after it is chewed and discarded.

The present invention may be used with a variety of processes for manufacturing chewing gum including batch mixing, continuous mixing and tableted gum processes.

Chewing gum is generally manufactured by sequentially adding the various chewing gum ingredients to commercially available mixers known in the art. After the ingredients have been thoroughly mixed, the chewing gum mass is discharged from the mixer and shaped into the desired form, such as by rolling into sheets and cutting into sticks, tabs or pellets or by extruding and cutting into chunks.

Generally, the ingredients are mixed by first softening or melting the gum base and adding it to the running mixer. The gum base may alternatively be softened or melted in the mixer. Color and emulsifiers may be added at this time.

A chewing gum softener such as glycerin can be added next along with part of the bulk portion. Further parts of the bulk portion may then be added to the mixer. Flavoring agents are typically added with the final part of the bulk portion. The entire mixing process typically takes from about fifteen to about twenty minutes, although longer mixing times are sometimes required.

Of course, many variations on the basic gum base and chewing gum mixing processes are possible.

After mixing, the chewing gum mass may be formed, for example by rolling or extruding into and desired shape such as sticks, tabs, chunks or pellets. The product may also be filled (for example with a liquid syrup or a powder) and/or coated for example with a hard sugar or sugar alcohol coating using known methods.

After forming, and optionally filling and/or coating, the product will typically be packaged in appropriate packaging materials. The purpose of the packaging is to keep the product clean, protect it from environmental elements such as oxygen, moisture and light and to facilitate branding and retail marketing of the product.

EXAMPLES

The following examples of the invention and comparative formulations are provided to illustrate, but not to limit, the invention which is defined by the attached claims. Amounts listed are in weight percent.

Four different molecular weights of polyfarnesene were prepared. A reaction mechanism for the preparation was as follows:

1,4 PF Synthesis components:
Solvent
Cyclohexane
Monomer
β-farnesene
Initiator
n-Butyl Lithium or sec-Butyl Lithium
Non-Solvent
Ethanol
Inhibitor
t-Butyl Catachol The molecular weight, polydispersity (determined by GPC), glass transition temperature (determined by DSC), and thermal degradation (temperature at which 1% of the sample was lost during thermal gravimetric analysis) of two of the polyfarnesene samples was measured and is reported in the Table 1 below.

TABLE 1

| | Molecular Weight | Polydispersity | $T_g$ (° C.) | $T_d$ (° C.) (1% weight loss) |
|---|---|---|---|---|
| Sample 1 | 451 Kd | 1.39 | −76.5 | 290 |
| Sample 2 | 521 Kd | | | |
| Sample 3 | 919 Kd | 1.22 | −76.2 | 290 |
| Sample 4 | 1021 Kd | | | |

Figure 1:
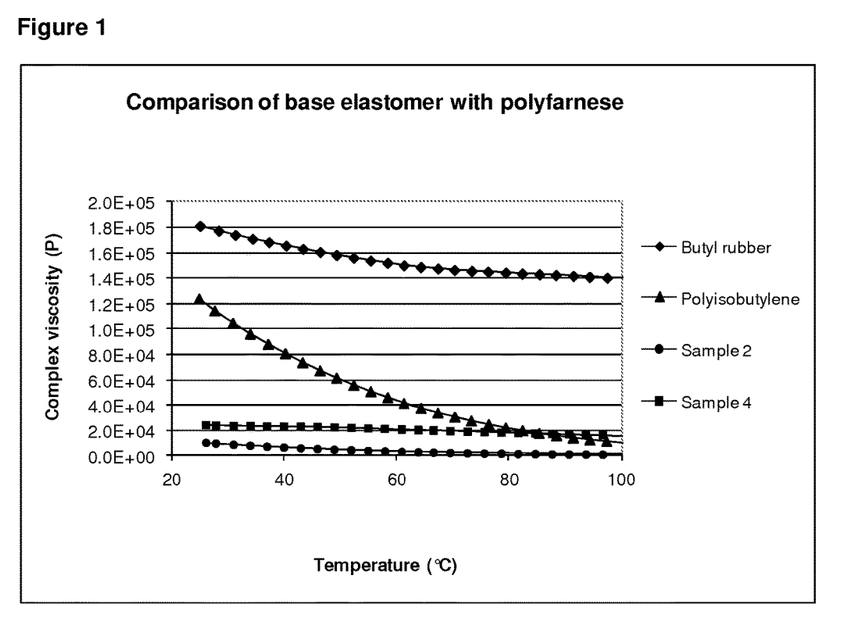
FIG. 1 is a graphical illustration of the complex viscosity as a function of temperature for two samples of polyfarnesene and two conventional chewing gum base elastomers.

FIG. 1 shows the complex viscosity of the polyfarnesene Samples 2 and 4 compared to two conventional chewing gum base elastomers, butyl rubber and polyisobutylene. Complex viscosity (reported in units of Poise (P)) is a good characteristic to compare for polymers considered for use in gum bases. The complex viscosity is the complex modulus divided by the angular frequency. The complex modulus is the overall resistance to deformation of a material, regardless of whether that deformation is recoverable (elastic) or non-recoverable (viscous). The polyfarnesene samples had significantly lower complex viscosity values compared to the conventional elastomers. These test results were obtained under the following conditions:

INSTRUMENTATION: Rheometric Dynamic Analyzer RDA III.

TESTING METHOD #1: Weigh a 1.5 g polymer sample and make it into disk-like shape with thickness>2 mm; Geometry Type=Parallel Plates (ParaPlate); Diameter =25.0 mm; Test Type=Dynamic temperature sweep (DTempSwp); Strain=0.5%; Temperature=−20~120° C.; Frequency=10 rad/s.

The different samples of polyfarnesene were made into chewing gum bases using the formulations as shown in Table 2 below. A comparative example gum base was also made, using polyisobutylene and butyl rubber as elastomers.

TABLE 2

| Ingredient | Comparative Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| Polyisobutylene | 1.60 | 1.60 | 1.60 | | | | | | | | |
| Butyl rubber | 8.67 | | | | | | | | | | |
| Polyfarnesene 451 Kd | | 8.67 | | 60.00 | | | | | | | |
| Polyfarnesene 571 Kd | | | | | 55.52 | | | | | | |
| Polyfarnesene 919 Kd | | | 8.67 | | | | | 50.00 | | | |
| Polyfarnesene 1021 Kd | | | | | | 50.00 | 50.00 | | 50.00 | 30.00 | 20.12 |
| Terpene resin | 22.23 | 22.23 | 22.23 | | | | | | 17.00 | 30.00 | 36.22 |
| PVAc | 23.92 | 23.92 | 23.92 | | | | | | | | |
| Calcium carbonate | 22.60 | 22.60 | 22.60 | 23.00 | 33.00 | 44.41 | 20.00 | 33.00 | 20.00 | 27.00 | 30.18 |
| Hydrogenated cottonseed oil | 4.73 | 4.73 | 4.73 | 7.00 | 7.00 | | 4.00 | 7.00 | 4.00 | 3.00 | 2.41 |
| Hydrogenated soybean oil | 4.40 | 4.40 | 4.40 | 5.78 | 5.78 | | 4.78 | 5.78 | 4.78 | 4.78 | 3.36 |
| Glycerol monostearate | 4.16 | 4.16 | 4.16 | 4.16 | 4.16 | | 4.16 | 4.16 | 4.16 | 4.16 | 2.61 |
| Partially hydrogenated cottonseed oil | 4.40 | 4.40 | 4.40 | | | | | | | | |
| Lecithin | 3.23 | 3.23 | 3.23 | | | | | | | 1.00 | |
| Microcrystalline wax | | | | | | | | | | | 5.03 |
| Glycerol ester of partially hydrogenated gum rosin | | | | | | | 17.00 | | | | |
| BHA | 0.06 | 0.06 | 0.06 | 0.06 | 0.06 | 0.07 | 0.06 | 0.06 | 0.06 | 0.06 | 0.07 |
| Total | 100.00 | 100.00 | 100.00 | 100.00 | 100.00 | 100.00 | 100.00 | 100.00 | 100.00 | 100.00 | 100.00 |

The sample gum bases were made using a Haake brand mixer, operated at 42 rpm and 120° C.

Figure 2:
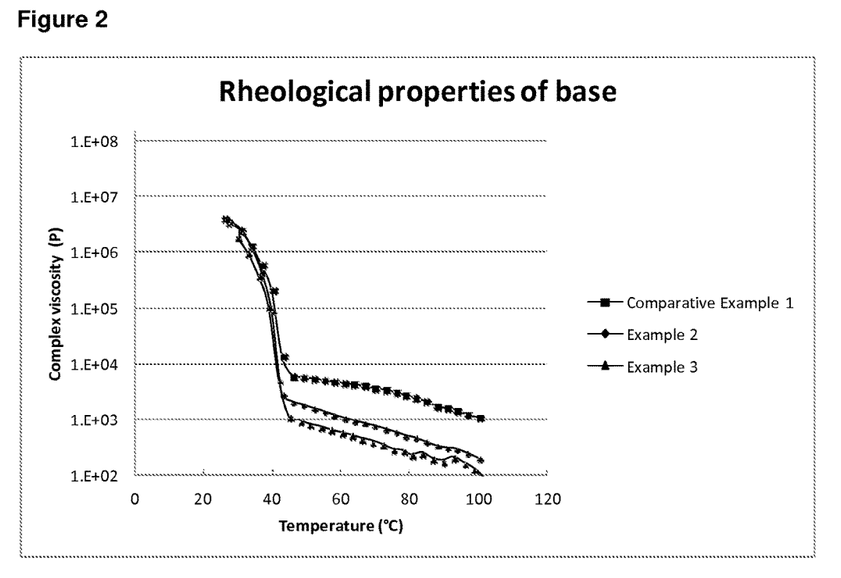
FIGS. 2-4 are graphic illustrations of the complex viscosity as a function of temperature of nine different gum bases.
Figure 3:
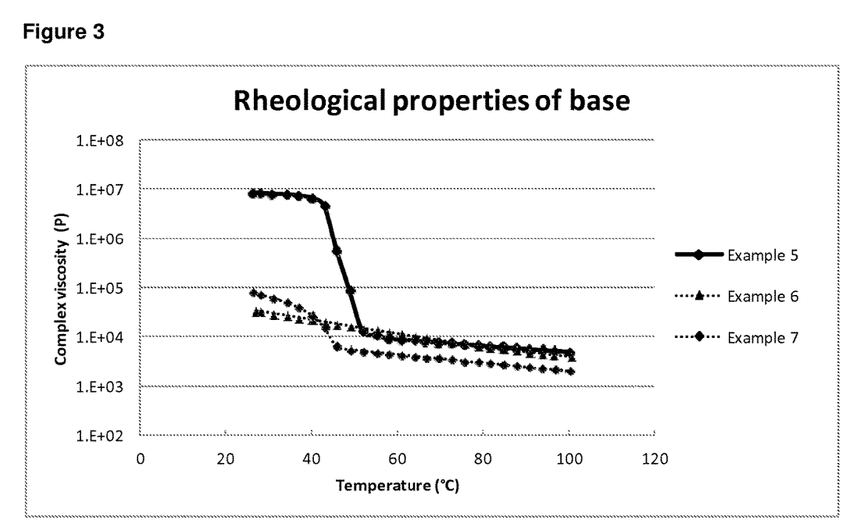
Figure 4:
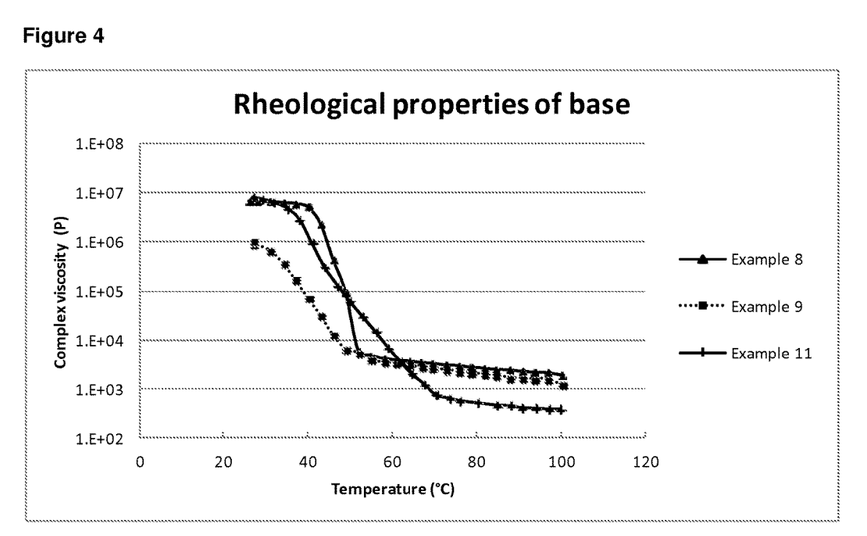
Figure 5:
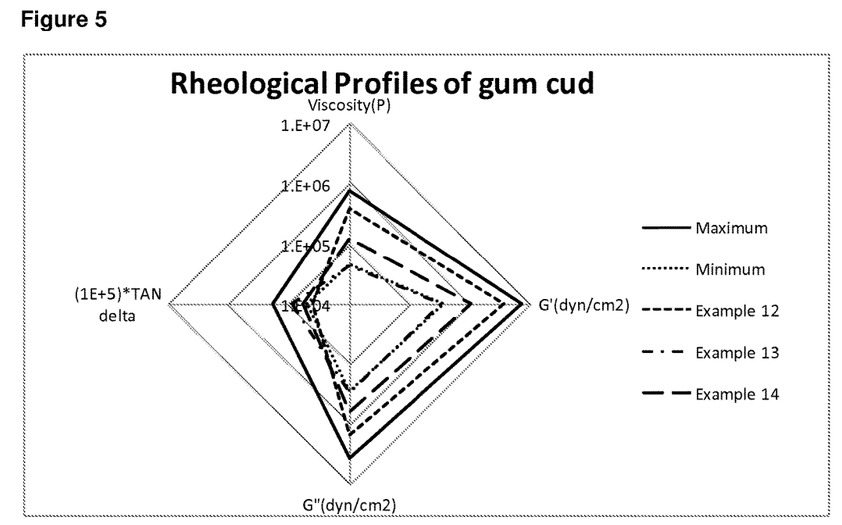
FIGS. 5-8 are spider charts depicting profiles of four different rheological properties of gum cuds from ten different chewing gum products.
Figure 6:
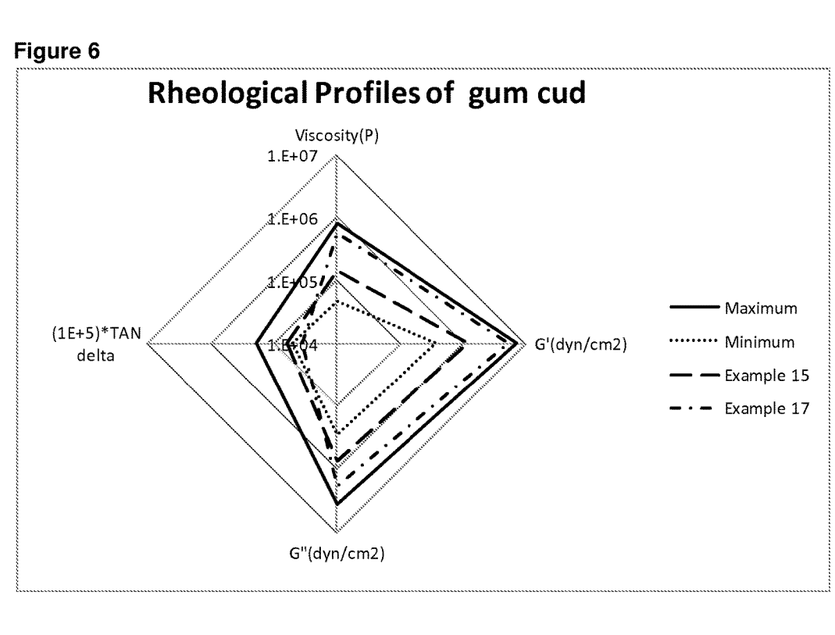
Figure 7:
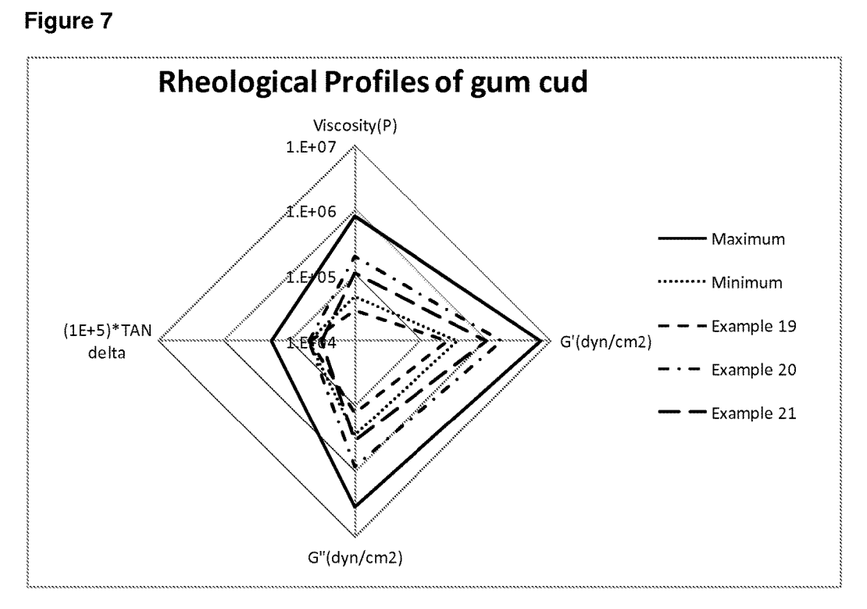
Figure 8:
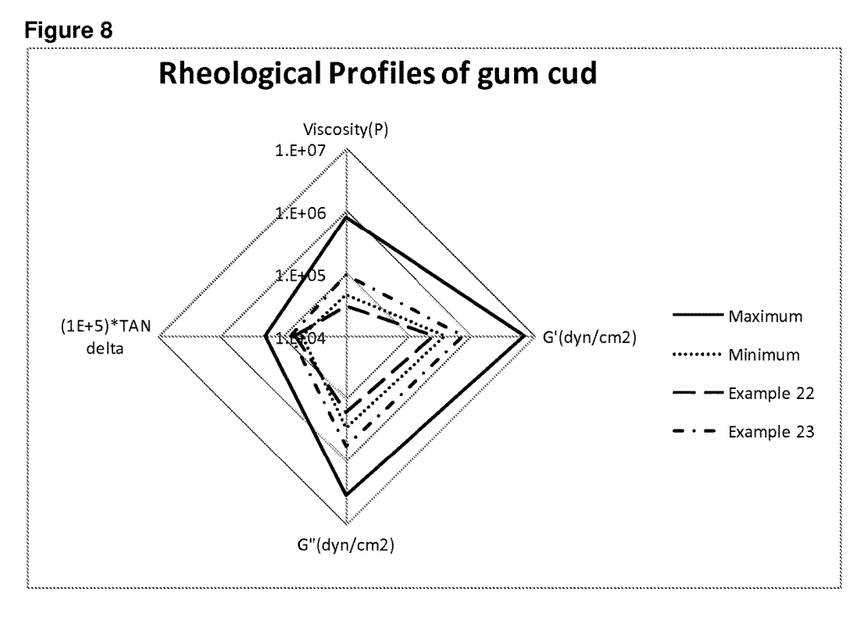

FIGS. 2-4 show the complex viscosity of some of the sample gum bases. The test data was obtained using the same test method #1 as noted above for obtaining complex viscosity of the polyfarnesene samples. The rheological properties of the base made with polyfarnesene showed a similar complex viscosity profile to the comparative example gum base.

The different samples of gum base were made into chewing gum compositions using the formulations as shown in Table 3 below. The comparative example gum base was also made into a comparative example chewing gum composition.

TABLE 3

| Ingredient | Comparative Ex. 12 | Ex. 13 | Ex. 14 | Ex. 15 | Ex. 16 | Ex. 17 | Ex. 18 | Ex. 19 | Ex. 20 | Ex. 21 | Ex. 22 | Ex. 23 |
|---|---|---|---|---|---|---|---|---|---|---|---|---|
| Comparative Example 1 | 32.00 | | | | | | | | | | | |
| Example 2 | | 32.00 | | | | | | | | | | |
| Example 3 | | | 32.00 | | | | | | | | | |

TABLE 3-continued

| Ingredient | Comparative Ex. 12 | Ex. 13 | Ex. 14 | Ex. 15 | Ex. 16 | Ex. 17 | Ex. 18 | Ex. 19 | Ex. 20 | Ex. 21 | Ex. 22 | Ex. 23 |
|---|---|---|---|---|---|---|---|---|---|---|---|---|
| Example 4 | | | | 45.00 | | | | | | | | |
| Polyfarnesene 919 Kd | | | | | 51.11 | | | | | | | |
| Example 5 | | | | | | 32.00 | | | | | | |
| Example 6 | | | | | | | 32.00 | | | | | |
| Example 7 | | | | | | | | 50.00 | | | | |
| Example 8 | | | | | | | | | 50.00 | | | |
| Example 9 | | | | | | | | | | 50.00 | | |
| Example 10 | | | | | | | | | | | 40.00 | |
| Example 11 | | | | | | | | | | | | 40.00 |
| Sorbitol | 52.65 | 52.65 | 52.65 | 45.00 | 40.00 | 45.00 | 45.00 | 45.00 | 45.00 | 45.00 | 50.10 | 45.00 |
| Mannitol | 3.22 | 3.22 | 3.22 | 5.00 | 4.45 | 18.00 | 18.00 | | | | 0.15 | |
| Hydrogenated starch hydrolysate | 0.83 | 0.83 | 0.83 | | | | | | | | 0.55 | 10.00 |
| Water | 0.45 | 0.45 | 0.45 | | | | | | | | 0.30 | |
| Glycerin | 9.35 | 9.35 | 9.35 | 3.50 | 3.11 | 3.50 | 3.50 | 3.50 | 3.50 | 3.50 | 7.40 | 3.50 |
| Flavor | 1.00 | 1.00 | 1.00 | | | | | | | | | |
| Aspartame | 0.50 | 0.50 | 0.50 | 0.50 | 0.44 | 0.50 | 0.50 | 0.50 | 0.50 | 0.50 | 0.50 | 0.50 |
| Peppermint flavor | | | | 1.00 | 0.89 | 1.00 | 1.00 | 1.00 | 1.00 | 1.00 | 1.00 | 1.00 |
| Total | 100.00 | 100.00 | 100.00 | 100.00 | 100.00 | 100.00 | 100.00 | 100.00 | 100.00 | 100.00 | 100.00 | 100.00 |

The sample chewing gum compositions were made using a Haake brand mixer, operated at 42 rpm and 55° C.

The sample chewing gums were kneaded under water to simulate chewing and produce a cud. An ultrasonic water bath was used, with ultrasonic agitation for 10 minutes, followed by finger kneading under fresh running water for five minutes, with these cycles repeated for a total of one hour. Four rheological properties of the gum cuds from these samples were tested and compared to rheological properties of gum cuds from three commercial chewing gum products. The properties tested were: (1) Viscosity—The resistance of a fluid to flow. In shear deformation, viscosity is the ratio of applied shear stress to resulting shear rate, reported in units of Poise; (2) Elastic Modulus—The contribution of elastic (solid-like) behavior to the complex modulus (G', reported in units of dyn/cm$^2$); (3) Viscous Modulus—The contribution of viscous (liquid-like) behavior to the Complex Modulus (G", reported in units of dyn/cm$^2$); and (4) Tan Delta—The tangent of the phase angle, the ratio of viscous modulus to elastic modulus and a useful quantifier of the presence and extent of elasticity in a fluid, the relative degree of damping of the material. This is an indicator of how efficiently a material loses energy to molecular rearrangements and internal friction.

These test results were obtained under the following conditions:
INSTRUMENTATION: Rheometric Dynamic Analyzer RDA III.
TESTING METHOD #2: Weigh a 1.5 g polymer sample and make it into disk-like shape with thickness>2 mm; Geometry Type=Parallel Plates (ParaPlate); Diameter=25.0 mm; Test Type=Dynamic Strain Frequency Sweep (DFreqSwp); Strain=0.5%; Temperature=37° C.; Frequency=0.1-100 rad/s.

The results of the tests are shown in FIGS. 5-8. In these spider charts, the center of the chart represents a value of $1 \times 10^4$, and each succeeding further out line has a value of 10 times the value of the previous point or line. (The Tan Delta values are reported multiplied by $1 \times 10^5$ so that they can be represented on this same scales on the spider charts.) In each of FIGS. 5-8 the "Maximum" and "Minimum" data represent values for the maximum and minimum values of the four rheological properties for the three commercial products. Even though one commercial product did not produce all of the maximum values or all of the minimum values, it is helpful to compare a cud from a given sample chewing gum composition to the composite maximum and minimum values of the three commercial chewing gum compositions.

From these charts it can be seen that several samples had cud properties that were within the commercial gum cud boundary for all four of the rheological properties discussed above: both chewing gums (Examples 14 and 20) made from the gum bases (Examples 3 and 8) containing polyfarnesene with a molecular weight of 919 kilodaltons; one chewing gum (Example 15) made from the gum base (Example 4) containing polyfarnesene with a molecular weight of 451 kilodaltons; and one chewing gum (Example 23) made from the gum base (Example 11) containing polyfarnesene with a molecular weight of 1021 kilodaltons. Two other samples, Examples 13 and 20, were very close to meeting this test. The Example 4 gum base was very sticky, and its rheological properties could not be measured as a gum base. The Example 23 gum cud, made with the Example 11 gum base containing wax, had low stickiness and its cud properties were within the maximum-minimum rheological boundary. The Example 9 base was made with a terpene resin that had a melting point between 120° C. and 128° C., which was higher than the melting point of the terpene resin used in Example 1-3. The Example 9 gum base showed improvement in cohesiveness.

The results of these tests demonstrated that gum base made from polyfarnesene can perform similar to commercial base in gum, particularly in replacing butyl rubber.

In addition to homopolymers made from farnesene, interpolymers of farnesene are also useful in practicing the invention. One way to make a copolymer of farnesene and isoprene is to mix a small amount of isoprene monomer with farnesene and then polymerize. This will produce some cross linking and network formation during the reaction to build the molecular weight of the growing polymer. The reaction of 1-4% isoprene monomer with 95% isobutylene monomer does the same thing to make butyl rubber. An example using styrene to make poly(styrene)-poly(1,4farnesene)-poly(styrene) is as follows. A solution of cyclohexane with 12% farnesene was made in a baked three neck reactor under an inert atmosphere. The solution was dried over a 3A molecular sieve overnight. A solution of cyclohexane and 10% styrene was made under a nitrogen atmosphere. The solution was dried over a 3A molecular sieve overnight. The next day, the appropriate quantity of the polystyrene solution was transferred to a baked reaction vessel with an inert atmosphere. The appropriate amount of initiator was then added to the reaction vessel. N-butyl lithium was used as the initiator. The reaction vessel was then heated to 50° C., and the reaction was allowed to continue to completion. The reaction was monitored by GPC. Next, the appropriate quantity of the farnesene solution was transferred to the reaction vessel with an inert atmosphere. The reaction was allowed to run to completion resulting in diblock copolymers. This reaction was monitored by GPC. The dichlorosilane coupling agent was then added in three equal aliquots, such that the total ratio of Li to Cl was 2. The coupling reaction was allowed go to completion as indicated by the color change in the reaction vessel. The resultant polymer was precipitated from solution with a 1% solution of ethanol and t-butyl catachol, collected, and dried in a vacuum oven at 60° C. for 2 hours and then kept in vacuum overnight. The resultant polymer was then stored in a refrigerator to prevent any cross linking before characterization.

Thus, the polyfarnesene may be made in such a way so as to create networks, entanglements and cross links. Another way to make copolymers and or cross link or network (form entanglements) is to run the synthesis of each polymer independently to make a certain molecular weight of each (not necessarily the same molecular weight), then mix the two and allow the reactions to continue and stop when a desired endpoint is reached, such as desired viscosity or another rheology parameter. Using a vinyl acetate monomer with farnesene would work well. See U.S. Pat. No. 7,655,739, which is incorporated herein by reference. Also, like farnesene, vinyl acetate can be made from a renewable source. Methane (which can come from a variety of renewable sources or from natural gas) is converted to acetylene and then reacted with acetic acid to produce the vinyl acetate monomer.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A chewing gum comprising at least a sweetener, a flavoring agent, and a chewing gum base comprising a food acceptable homopolymer of polyfarnesene wherein the polyfarnesene homopolymer has a weight average molecular weight above 900,000 daltons.

2. The chewing gum of claim 1 wherein the polyfarnesene has a weight average molecular weight above 1,500,000 daltons.

3. The chewing gum of claim 1 wherein the gum base comprises from 5 to 95% polyfarnesene by weight of the gum base.

4. The chewing gum of claim 1 wherein the gum base comprises from 30 to 60% polyfarnesene by weight of the gum base.

5. The chewing gum of claim 1 wherein the gum base comprises from 1 to 30% by weight of at least one elastomer other than polyfarnesene.

6. The chewing gum of claim 5 wherein the gum base comprises from 1.5 to 11% by weight of at least one elastomer other than polyfarnesene.

7. The chewing gum of claim 5 wherein the at least one elastomer other than polyfarnesene comprises polyisobutylene.

8. The chewing gum of claim 1 further comprising from 3 to 8% by weight of emulsifier.

9. The chewing gum of claim 1 further comprising from 20 to 30% by weight of polyvinyl acetate having a weight average molecular weight between 8,000 daltons and 150,000 daltons.

10. The chewing gum of claim 1 further comprising from 1 to 50% by weight of wax.

11. The chewing gum of claim 10 wherein the wax has a melting point of at least 80° C.

12. The chewing gum of claim 1 further comprising from 1 to 50% by weight of filler.

13. The chewing gum of claim 1 further comprising from 1 to 40% by weight terpene resin.

14. The chewing gum of claim 1 further comprising from 0.1 to 20% by weight of a fat having a melting point of at least 45° C.

15. The chewing gum of claim 1 wherein the polyfarnesene homopolymer is from α-farnesene and/or β-farnesene.

16. A chewing gum composition comprising:
a) about 5% to about 95% chewing gum base comprising a food acceptable homopolymer of polyfarnesene wherein the polyfarnesene homopolymer has a weight average molecular weight above 900,000 daltons;
b) about 5% to about 95% bulking and sweetening agent; and
c) about 0.1 to about 10% flavoring agent.

* * * * *